Figure 1:
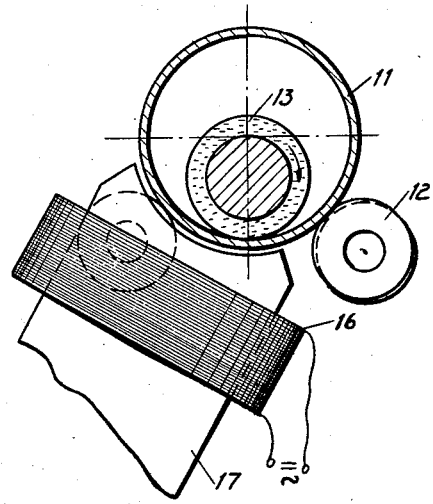

Jan. 7, 1958 L. G. SWEDMARK 2,818,688
DEVICE FOR INSIDE MACHINING AS GRINDING, MILLING ETC., OF
TUBES AND METHOD FOR PERFORMANCE OF THIS OPERATION
Filed Sept. 14, 1954 2 Sheets-Sheet 1

Jan. 7, 1958           L. G. SWEDMARK           2,818,688
DEVICE FOR INSIDE MACHINING AS GRINDING, MILLING ETC., OF
TUBES AND METHOD FOR PERFORMANCE OF THIS OPERATION

Filed Sept. 14, 1954           2 Sheets-Sheet 2

Inventor:
Lennart Gregor Swedmark,
by Pierce, Scheffler & Parker,
Attorneys.

2,818,688
Patented Jan. 7, 1958

2,818,688

DEVICE FOR INSIDE MACHINING AS GRINDING, MILLING, ETC., OF TUBES AND METHOD FOR PERFORMANCE OF THIS OPERATION

Lennart Gregor Swedmark, Sandviken, Sweden, assignor to Sandvikens Jernverks Aktiebolag, Sandviken, Sweden Application September 14, 1954, Serial No. 455,829

Claims priority, application Sweden September 15, 1953

7 Claims. (Cl. 51—103)

The following invention relates to an improved method and apparatus for, as grinding, milling, polishing and machining the inner surface of tubes or tubular bodies.

In the manufacturing of tubes, particularly stainless tubes, there are generally surface defects in both the inner and outer tube surfaces. Removing these surface defects is a very expensive and time-consuming procedure, especially on the inner surfaces. On the outer surfaces it is possible to perform the machining by means of pendulum grinding, grinding with smaller hand machines (spot grinding) or by means of centerless machines, partly those with grinding wheel, partly with grinding belts. With respect to the inner surface it is most usual to grind with a grinding wheel, fastened on a long reciprocating and revolving spindle, or by endless belts extending through the tube. These methods have been unsatisfactory partly due to the problem of obtaining satisfactory grinding pressure without too great weight or coarse dimensions, and partly due to the tendency of the grinding wheel at the point of contact to move tangentially against its rotary direction, causing oscillation along the inner surface with resulting uneven machining. The same problems exist during other methods of machining of the inner surface, as milling, polishing etc. Because of the aforementioned drawbacks of the known inner machining devices, they are expensive to maintain and have low production capacity.

The invention relates to a solution of hitherto existing difficulties and is characterized in that one or more revolvable grinding wheels or the like with a diameter smaller than the inner diameter of the tube, are arraged to contact the inner surface of the tube, the pressure of the grinding wheel against the tube being applied by means of a magnetic force. The tube is arranged to revolve due to the rotation of the grinding wheel either by means of the contact with the grinding wheel and/or by separate tubes driving means. Thus a satisfactory grinding pressure is obtained without coarser dimensioning of the spindle of the grinding wheel and without using a mechanical force transmission device between the grinding wheel and its surroundings. The device is especially suitable for tubes of non-magnetical materials, as austenitic materials, copper, zinc, aluminum, concrete, wood etc., i. e. materials, which do not appreciably influence the magnetic field between magnet and iron core of the machining member. The device may also be adapted for use with also for magnetic materials.

Figure 2:
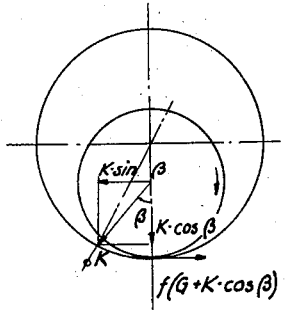
Figure 3:
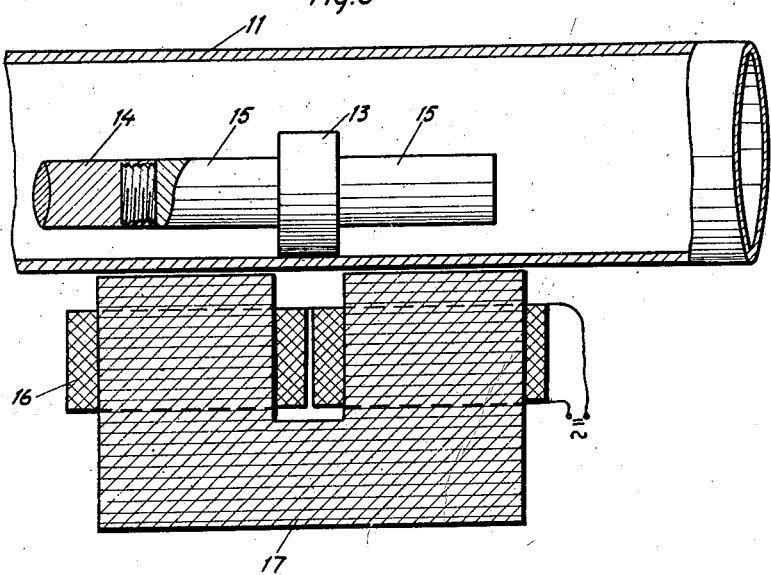
Figure 4:
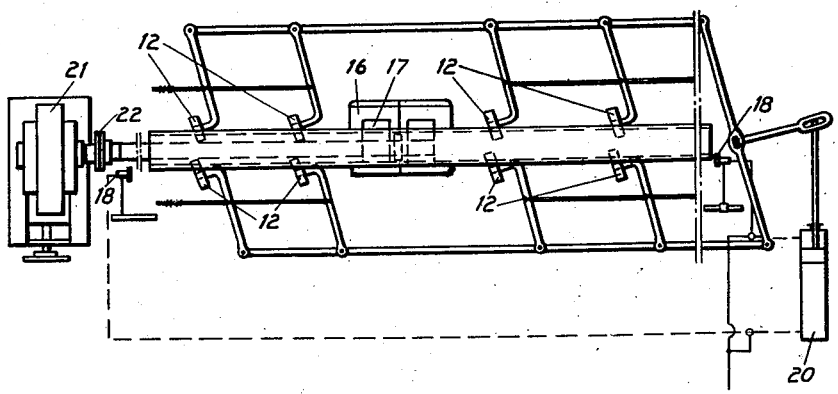
Figure 5:
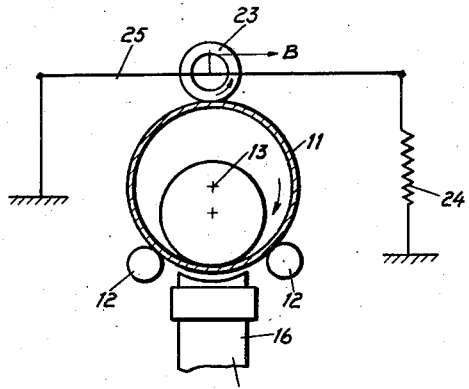

The invention is further illustrated in the accompanying figures, where Fig. 1 discloses a grinding device, as seen from one of the tube ends. Fig. 2 shows the force relations of the device. Fig. 3 shows, partly in section, a side view of the same device. Fig. 4 shows the feeding device with adjustment mechanism and brake device as seen from above. Fig. 5 shows an embodiment of the brake device and Fig. 6 an embodiment for the spindle of the grinding wheel.

Referring to Figs. 1 and 3 a grinding device for tubes 11 or similar tubular bodies is supported by rolls 12.

One or more grinding wheels 13 or the like are fastened to a spindle 14, which at the grinding wheel consists of ferromagnetic material 15. An electromagnet 16 with iron core 17, possibly laminated, is firmly or revolvably arranged near the tube and, as shown in Fig. 1, is fed with electricity (D. C. or A. C.) with or without a certain turning in relation to the longitudinal axis of the tube. By means of the increasing magnetic attraction upon the spindle 15 by the magnet, a grinding pressure is produced against the inner surface of the tube. Due to the rotation of the grinding wheel the tube will revolve in the same direction as the grinding wheel if the friction between grinding wheel and tube is enough to overcome the existing inertia forces in the tube. If the magnet should be placed in the vertical plane through the normal axis of the tube (Fig. 3), the grinding wheel would try to move from this plane along the inner surface of the tube against its revolving direction. In order to prevent this the magnet could be so offset (as shown in Fig. 1) and with such a magnetic force, that in accordance with Fig. 2 the friction force i. e. $f(G+K. \cos \beta)$ is equivalent to the horizontal composant of the magnetic force K, i. e. K. $\sin \beta$, where $f$ is the friction coefficient between grinding wheel and tube, $G$=the pressure against the tube caused by the weight of the grinding wheel etc., K is the magnetic force and $\beta$ the angle between normal axis and the main direction of the magnetic force. For the best operation of my invention it is necessary that the grinding wheel be rotated with approximatively a constant rate of rotation. By this means the grinding wheel will obtain an equilibrium position at the normal axis of the tube. Of course it is possible to continuously regulate the angle in accordance with this and it has been shown to be advantageous to give the grinding wheel an equilibrium position at a certain rotation, spaced from said normal axis. The same thing is true for other forms of machining than grinding. By means of this device it is possible that by changing the current strength, air gap and/or number of windings for the magnet the integral magnetic forces in the system will be changed. By means of the rotational movement the tube will be machined around its entire circumference.

It is, however, suitable simultaneously to feed the tube axially in order to get machining along the whole tube. This is accomplished by the device shown in Fig. 4. The tube is supported by a number of parallel rolls 12, which simultaneously (or independently) are angularly adjustable in such a way that their rotational axes are turnable in one plane parallel to the longitudinal axis of the tube. Upon rotation of the tube, due to the angle of the rotational axis of the rolls against the rotational axis of the tube, the tube will move axially in a speed and direction depending on the value of and the sign of this angle. The angle is changed by adjustment of the rolls with respect to each other. For example after a certain degree of adjusttment, the device may be provided with limit switches 18, influed by the tube, which by hydraulic, electric, or other means controls the movement of a servo-motor 20 for adjustment of this angle, for example changing of the direction of movement. Fig. 4 discloses a driving motor for the grinding wheel, which is provided with an elastic coupling 22 connected to the rotation spindle of the grinding wheel. The motor is both vertically and horizontally adjustable by means of the frame and screw devices according to Fig. 4. The offset adjustment of the magnet is also shown in this figure. It is, especially in smaller machineries, possible to change the electromagnet 16, 17 to permanent magnets.

In many cases it is desirable during friction driving of the tube to brake it during its rotation in order to get a satisfacotry degree of machining. This can be accomplished by various well-known brake devices for revolving spindles and machines which give the tube a variable or constant speed of rotation.

Such a device may consist of a friction brake or a separate driving device operating upon the roll 12 with constant or variable rate of rotation. In Fig. 5 a roll 23 with applied brake moment B (spring force at 24 with a lever device 25) may operate upon the tube an alternative construction would be to separately drive roll 23 with a constant or variable rate of rotation. The size of the brake effect may of course be made adjustable.

Figure 6:
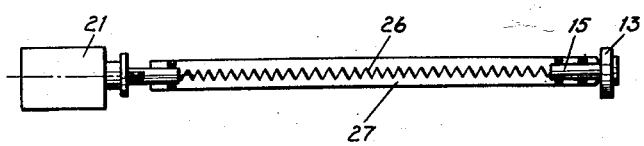

The transmission means between the driving motor and the grinding wheel (grinding wheels, cutter head etc.) may suitably be arranged as shown in Fig. 6 with a resilient spindle 26, arranged within a stiffening member 27, by means of which the grinding operation etc. may take place in an arbitrary angle in relation to the placing of the driving motor and with sufficient stability for the grinding wheel in relation to the tube.

The invention is naturally not limited to the above-described embodiments but may be varied within the scope of the following claims.

I claim:

1. Apparatus for machining the inner cylindrical surface of tubes or other similar articles comprising a non-magnetic grinding wheel having a diameter smaller than that of the inner surface of the tube, means for rotating said grinding wheel, said rotating means including a spindle shaft supporting said wheel, said shaft having a portion of magnetic material adjacent said wheel, and magnetic means to cause said grinding wheel to exert a desired pressure upon the inner surface of the tube as said grinding wheel is rotated, said magnetic means comprising a magnet external of the tube and spaced laterally from said magnetic member, said magnet producing a magnetic force of such a polarity as to attract said magnetic portion of said shaft.

2. Apparatus for machining the inner cylindrical surface of tubes as defined in claim 1 including roller means supporting said tube for free rotation in such a manner that the tube may be revolved about its longitudinal axis by the rotating grinding wheel.

3. The method of machining the inner cylindrical surface of tubular work pieces comprising the steps of placing the tubular work piece upon roller support means so that the tube is rotatable about its longitudinal axis, inserting into the tubular work piece a non-magnetic grinding wheel having a diameter smaller than that of the inner surface of the work piece, said grinding wheel having a magnetic member adjacent thereto, rotating said grinding wheel about its longitudinal axis, and applying a magnetic force upon said magnetic member to cause said grinding wheel to exert a desired pressure upon the inner surface of the tube as the grinding wheel is rotated.

4. The method of machining the inner cylindrical surface of tubular work pieces as defined in claim 3 wherein the magnetic force is of such a direction and magnitude that its horizontal component will be substantially equal and opposite to the frictional force between the tube and the grinding wheel when the grinding wheel is rotating at a constant rate of rotation.

5. Apparatus for machining the inner cylindrical surface of a tube or other similar article comprising a non-magnetic grinding wheel having a diameter smaller than that of the inner surface of the tube, means for rotating said grinding wheel at a constant speed of rotation, said rotating means including a spindle shaft supporting said wheel, said shaft having a portion of magnetic material adjacent said wheel, and a magnet external of the tube opposite said spindle magnetic portion attracting the same and causing said grinding wheel to exert a desired pressure upon the inner surface of the tube as said grinding wheel is rotated, said magnet being positioned at an angle with respect to the vertical plane passing through the longitudinal axis of the tube so that the magnetic force produced thereby has a horizontal component which is substantially equal to and opposite from the frictional force which exists between the tube and said rotating grinding wheel.

6. Apparatus for machining the inner cylindrical surface of a tubular workpiece comprising a non-magnetic grinding wheel having a diameter smaller than that of the inner surface of the workpiece, means for rotating said grinding wheel, said rotating means including a spindle shaft supporting said wheel, said shaft having a portion of magnetic material adjacent said wheel, a magnet external of the workpiece opposite said spindle magnetic portion attracting the same and causing said grinding wheel to exert a desired pressure upon the inner surface of the workpiece as said grinding wheel is rotated, said magnet being positioned at an angle with respect to the vertical plane passing through the longitudinal axis of the workpiece so that the magnetic force produced thereby has a horizontal component which is substantially equal to and opposite from the frictional force existing between the workpiece and said rotating grinding wheel, and means external of the workpiece for causing axial movement of said workpiece with respect to said grinding wheel and said magnet so that the entire inner circumference of the workpiece may be machined.

7. Apparatus for machining the inner cylindrical surface of a tubular grinding wheel having a diameter smaller than that of the inner surface of the workpiece, means for rotating said grinding wheel, said rotating means including a resilient spindle shaft supporting said wheel, said shaft having portions of magnetic material adjacent said wheel on both sides thereof, a magnet external of the workpiece opposite said grinding wheel, said magnet having one pole associated with the shaft magnetic portion on one side of said grinding wheel and a second pole associated with the shaft magnetic portion on the other side of said grinding wheel so that said magnet will attract said magnetic portions to cause said grinding wheel to exert a desired pressure upon the inner surface of the workpiece as said grinding wheel is rotated, and means external of the workpiece for causing axial movement of said workpiece with respect to said grinding wheel and said magnet so that the entire inner circumference of the workpiece may be machined.

References Cited in the file of this patent

UNITED STATES PATENTS

| | | |
|---|---|---|
| 1,050,534 | Hart et al. | Jan. 14, 1913 |
| 1,225,858 | Raule | May 15, 1917 |
| 1,319,000 | Holbein | Oct. 14, 1919 |
| 1,636,557 | Guthrie | July 19, 1927 |
| 1,698,458 | Simons | Jan. 8, 1929 |
| 2,004,649 | Booth et al. | June 11, 1935 |
| 2,056,182 | Gardner | Oct. 6, 1936 |
| 2,165,097 | Fuller | July 4, 1939 |
| 2,196,058 | Coats | Apr. 2, 1940 |
| 2,645,063 | Smith | July 14, 1953 |
| 2,680,939 | Humes | June 15, 1954 |

FOREIGN PATENTS

| | | |
|---|---|---|
| 593,705 | Germany | Mar. 1, 1934 |